US012573279B2

(12) United States Patent
Cuervo

(10) Patent No.: US 12,573,279 B2
(45) Date of Patent: Mar. 10, 2026

(54) SYSTEM FOR MONITORING AN INDIVIDUAL

(71) Applicant: Jessica Cuervo, Marysville, WA (US)

(72) Inventor: Jessica Cuervo, Marysville, WA (US)

( * ) Notice: Subject to any disclaimer, the term of this patent is extended or adjusted under 35 U.S.C. 154(b) by 273 days.

(21) Appl. No.: 18/537,273

(22) Filed: Dec. 12, 2023

(65) Prior Publication Data

US 2025/0191454 A1 Jun. 12, 2025

(51) Int. Cl.
*G08B 21/02* (2006.01)
*G08B 3/10* (2006.01)

(52) U.S. Cl.
CPC ........... *G08B 21/0269* (2013.01); *G08B 3/10* (2013.01); *G08B 21/0208* (2013.01); *G08B 21/0288* (2013.01)

(58) Field of Classification Search
CPC .................................................. G08B 21/0269
USPC .................................................... 340/539.13
See application file for complete search history.

(56) References Cited

U.S. PATENT DOCUMENTS 5,259,338 A * 11/1993 Cornell .................. A01K 27/00 297/484
6,396,403 B1 5/2002 Haner
7,598,856 B1 * 10/2009 Nick ...................... G08B 7/066 455/456.1
D806,779 S 1/2018 Martin
9,859,937 B2 1/2018 Chien
9,912,901 B2 3/2018 Thompson
10,257,434 B2 4/2019 Arnold
D865,844 S 11/2019 Jalala
11,257,343 B2 2/2022 Bloom
11,640,756 B2 * 5/2023 Pijl ........................ A61B 5/112 340/539.13
2004/0246126 A1 * 12/2004 Pitts ..................... A01K 11/008 340/539.13
2008/0036610 A1 * 2/2008 Hokuf .................. G08B 21/023 340/573.3
2012/0206296 A1 * 8/2012 Wan ........................ G01S 19/34 342/357.31
2015/0109126 A1 4/2015 Crawford
2018/0109765 A1 4/2018 Wu
2018/0354443 A1 * 12/2018 Ebrahimi ........... G08B 21/0277
2023/0001242 A1 * 1/2023 Damaske ........... A62B 35/0018
2024/0324702 A1 * 10/2024 Brown .................. A41D 1/002

FOREIGN PATENT DOCUMENTS

WO WO2017040724 3/2017

* cited by examiner

*Primary Examiner* — Travis R Hunnings

(57) ABSTRACT

A monitoring system for remotely monitoring the location of an individual includes a housing which attaches to a torso of an individual via a harness. A remote electronic device is used to control a processor mounted in the housing and electrically coupled to a global positioning system (GPS) module. The processor selectively transmits a location signal indicative of a location of the individual via a transceiver.

18 Claims, 7 Drawing Sheets

SYSTEM FOR MONITORING AN INDIVIDUAL

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to monitoring systems and more particularly pertains to a new monitoring system for remotely monitoring the location of an individual.

(2) Description of Related Art Including Information Disclosed Under 37 CFR 1.97 and 1.98

The prior art discloses myriad monitoring systems for remotely monitoring the location of an individual. However, the prior art does not describe such a system which is attached to the torso of the individual via a harness and includes a camera for recording images, a microphone for recording audio, a global positioning system module for determining a location of the individual, and a speaker for emitting an audible alarm.

BRIEF SUMMARY OF THE INVENTION

An embodiment of the disclosure meets the needs presented above by generally comprising a housing with a front side, a rear side, a top side, a bottom side, and a pair of lateral sides. A harness is coupled to the housing and is configured to attach to a torso of the individual such that the housing is positioned over the torso. A processor is mounted in the housing. A transceiver is mounted in the housing and is in communication with the processor. A remote electronic device is in communication with the processor via the transceiver and is programmed to control the processor. A global positioning system (GPS) module is mounted in the housing and is in communication with the processor. The processor is programed to selectively cause the GPS module to send a location signal to the processor indicative of a location of the individual. The processor is also programmed to selectively transmit the location signal to the remote electronic device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
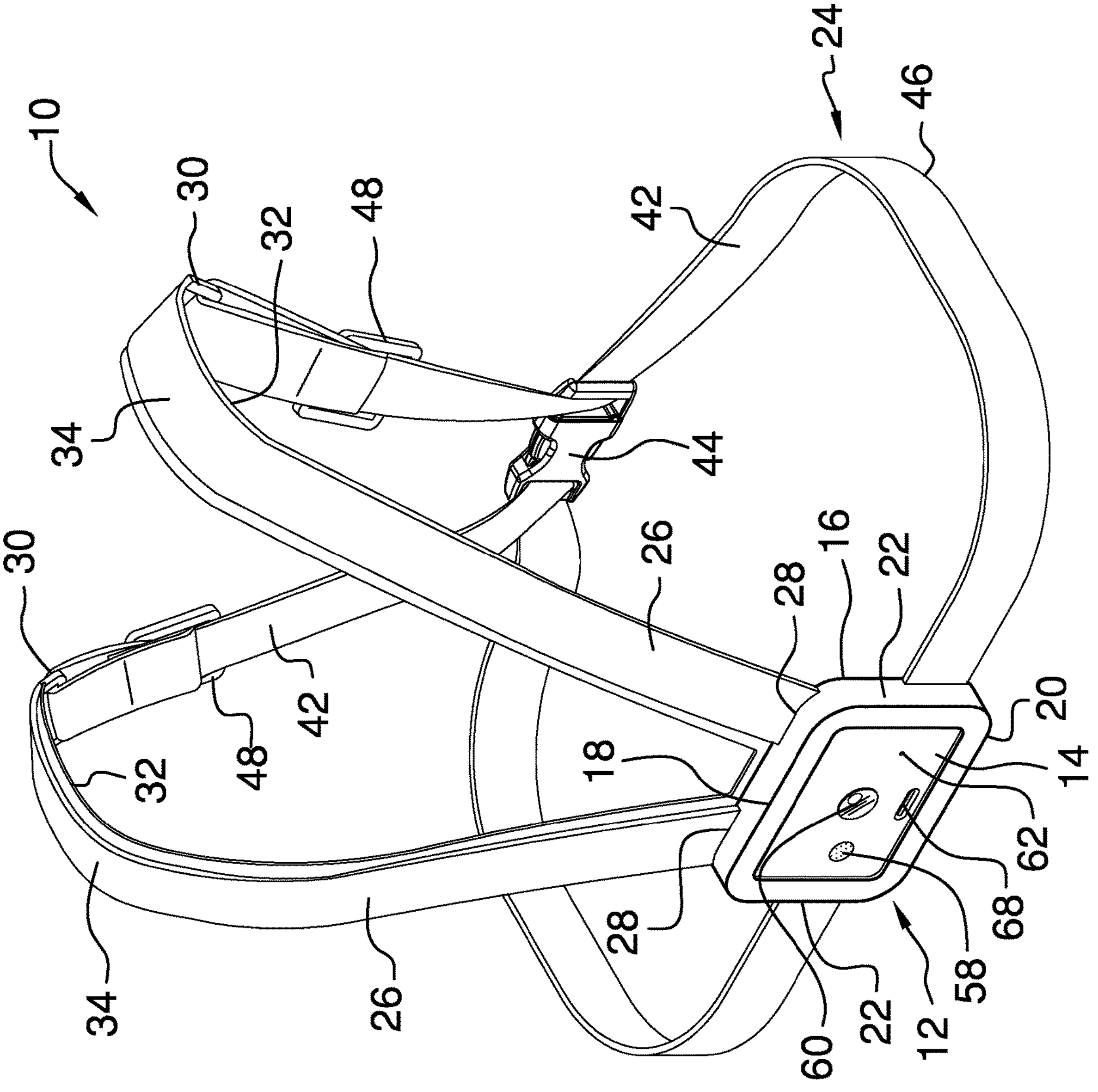
FIG. 1 is a perspective view of a monitoring system according to an embodiment of the disclosure.
Figure 2:
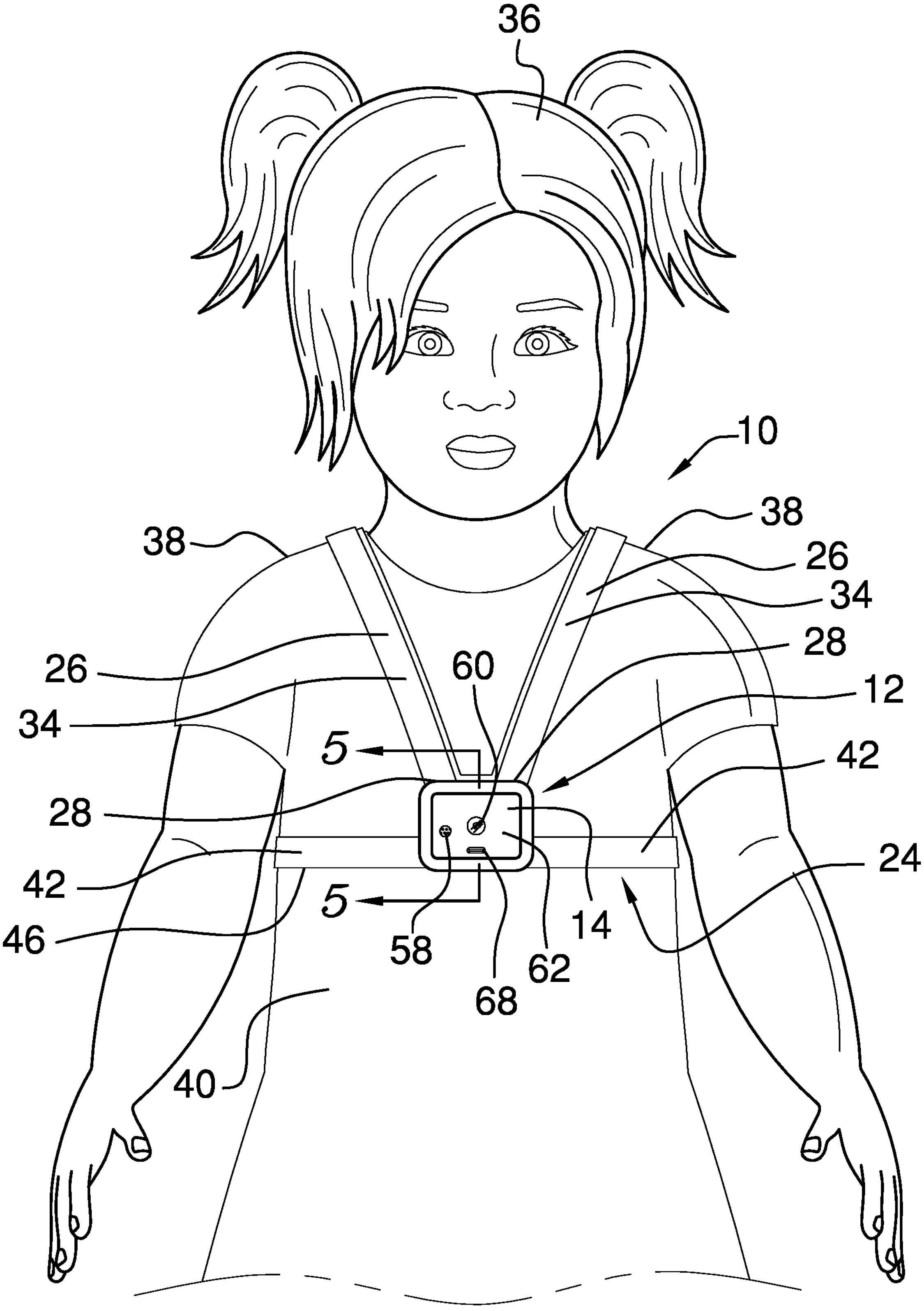
FIG. 2 is a front in-use view of an embodiment of the disclosure.
Figure 3:
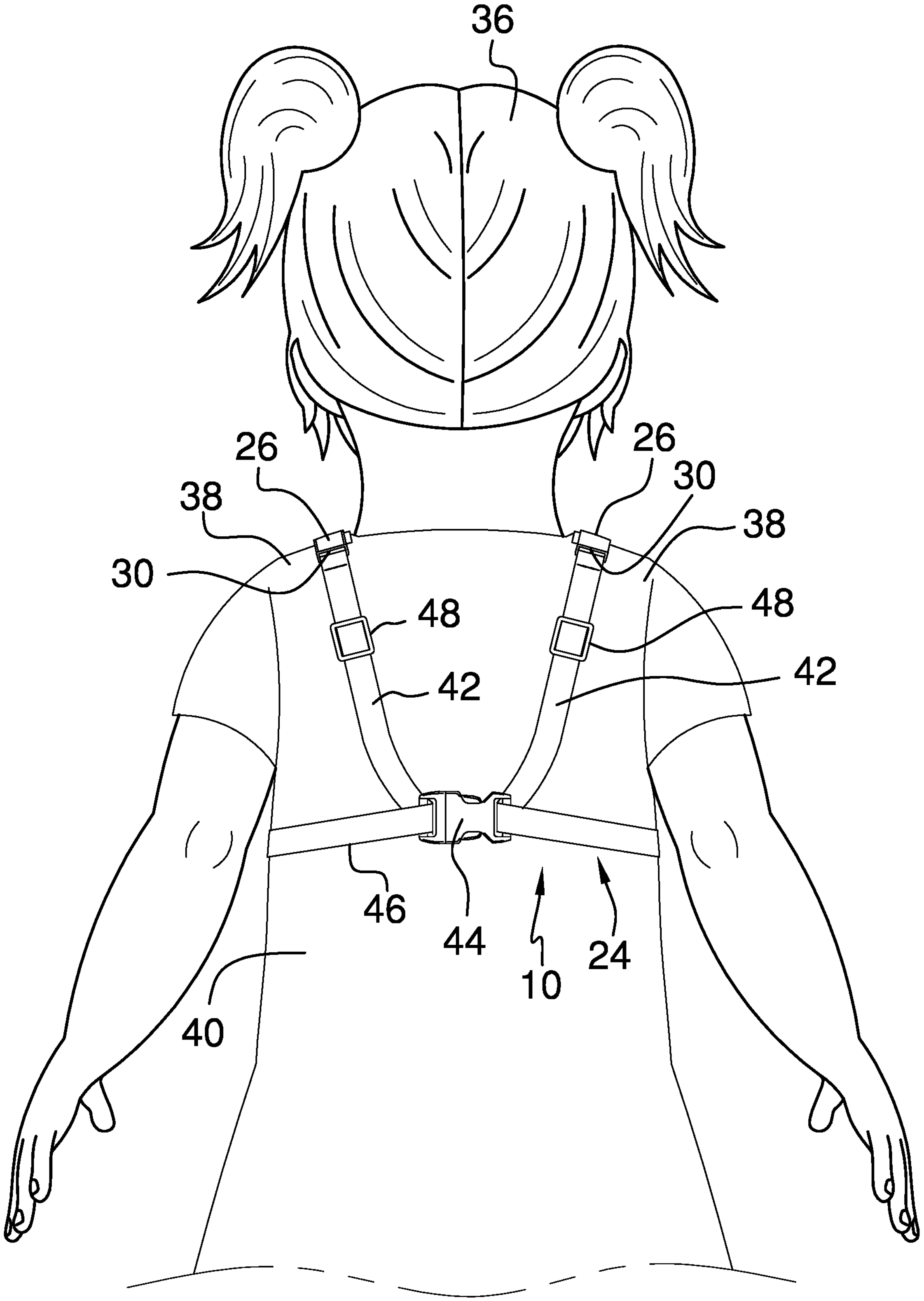
FIG. 3 is a back in-use view of an embodiment of the disclosure.
Figure 4:
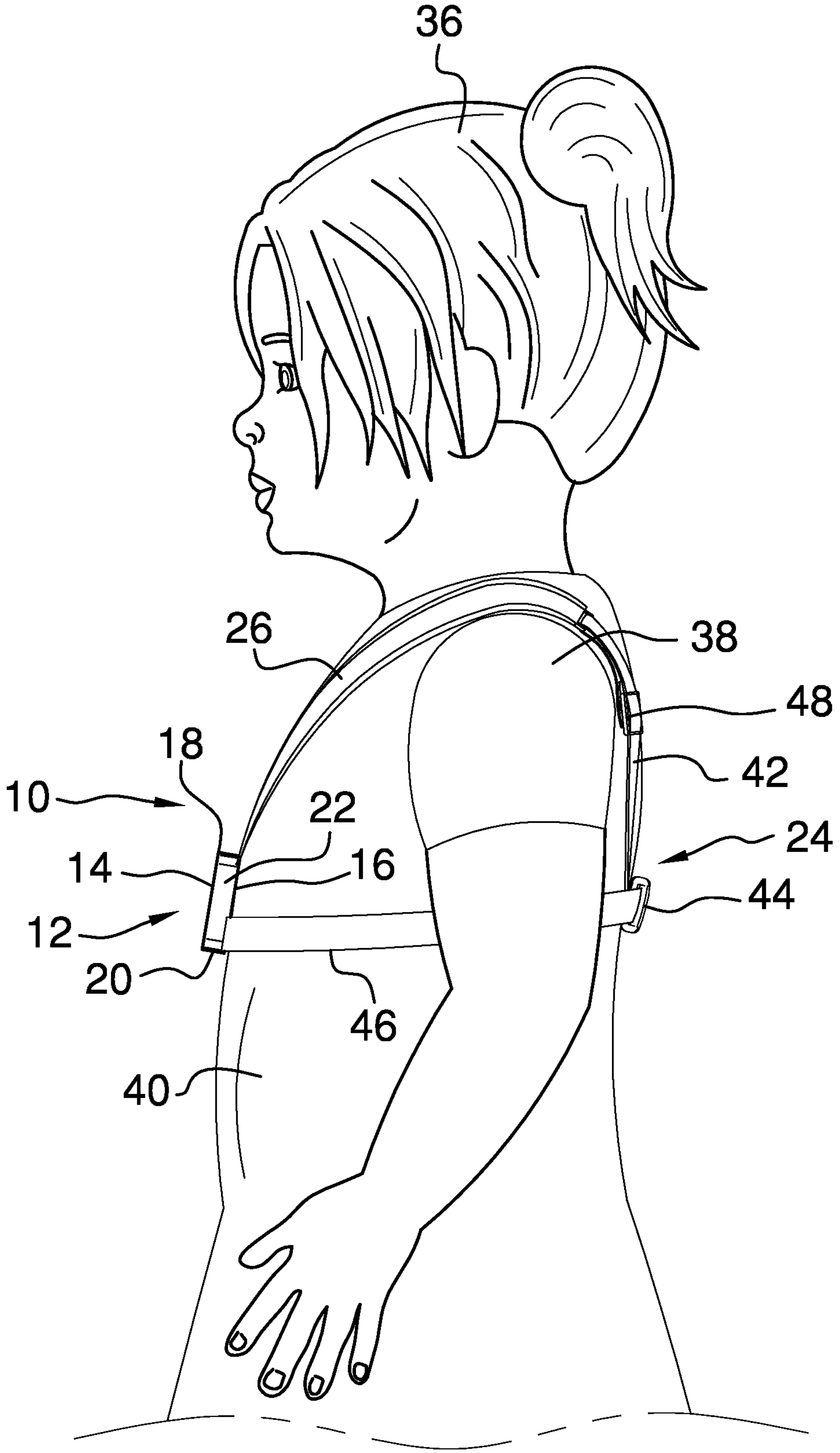
FIG. 4 is a side in-use view of an embodiment of the disclosure.
Figure 5:
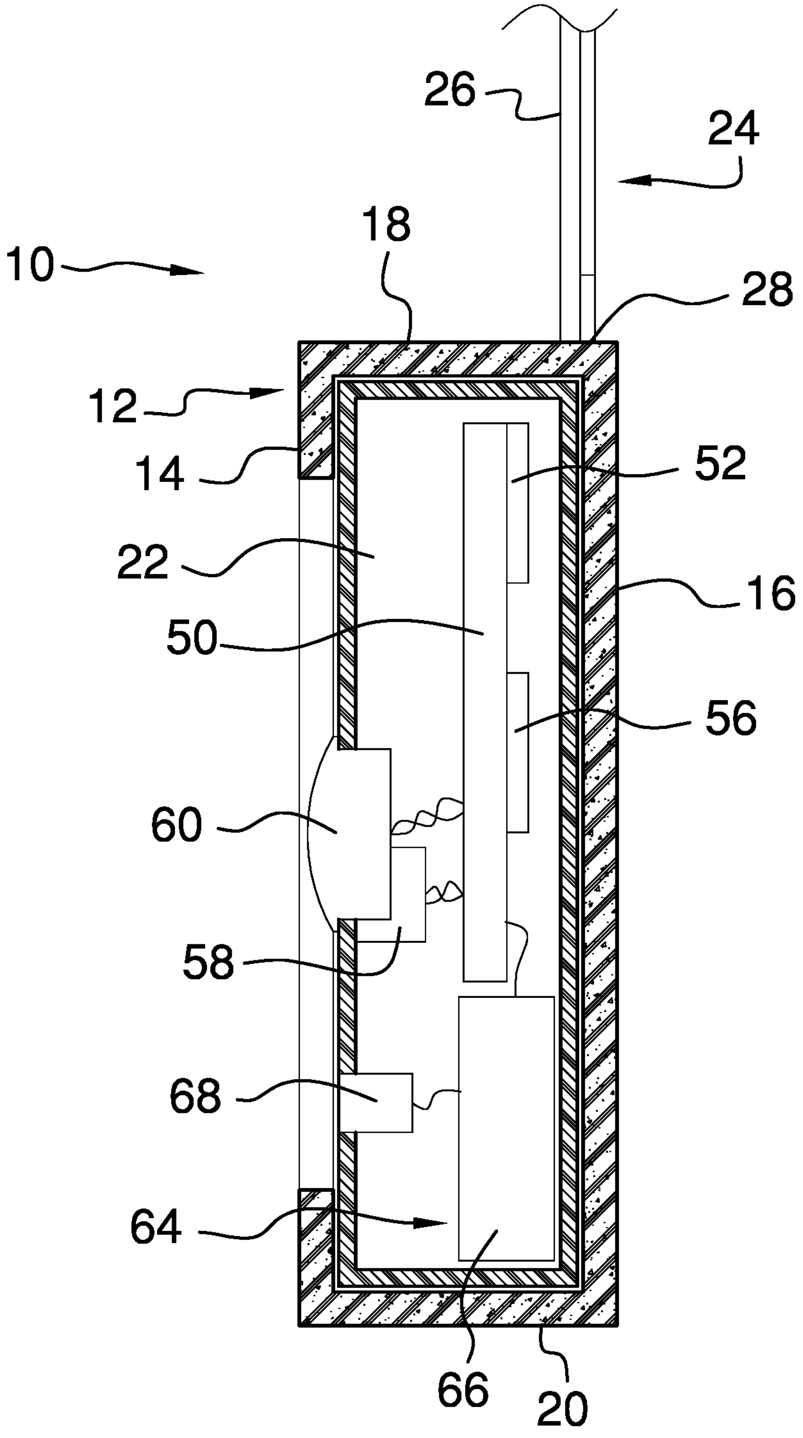
FIG. 5 is a cross-section view of an embodiment of the disclosure taken from Arrows 5-5 in FIG. 2.
Figure 6:
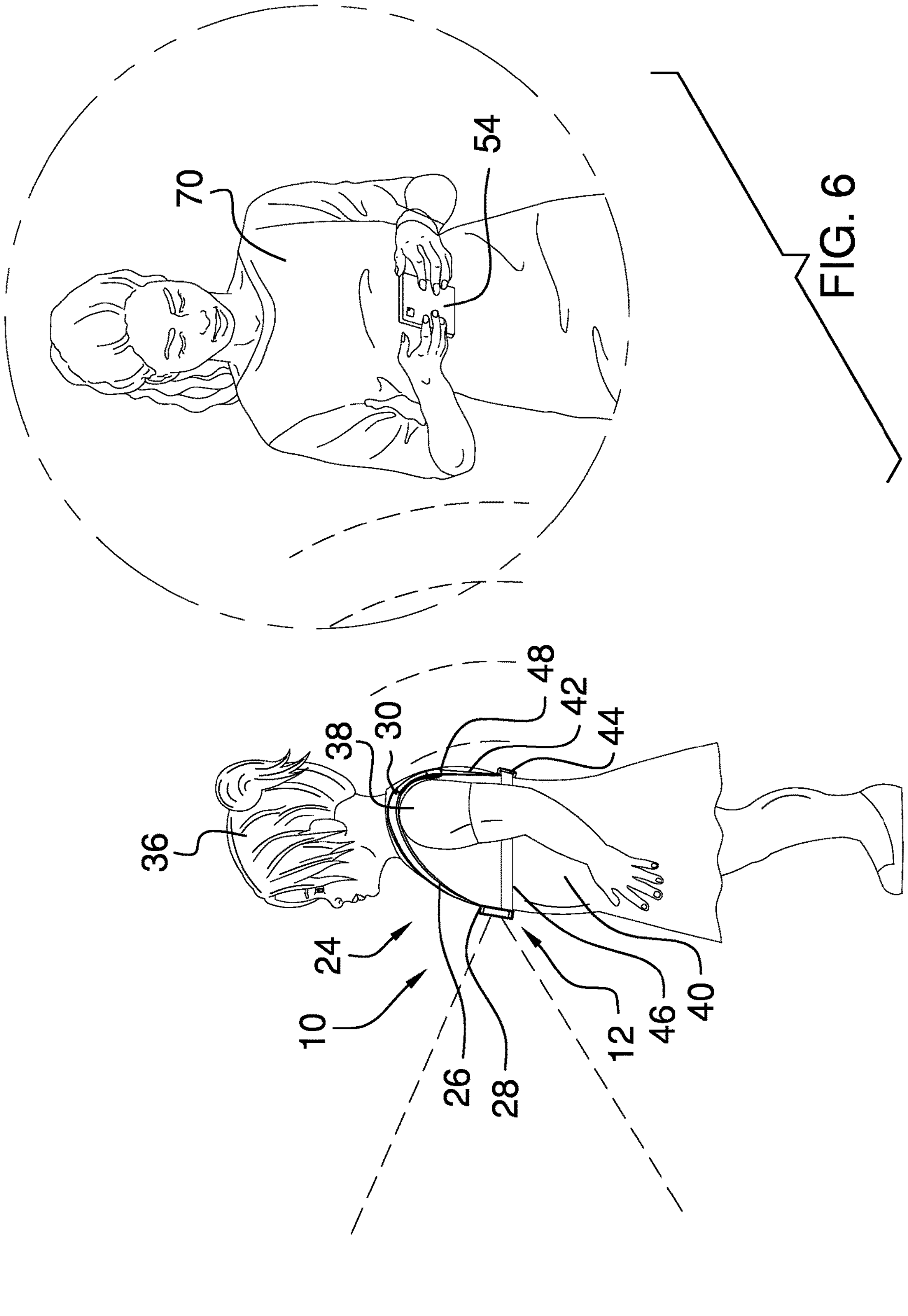
FIG. 6 is an in-use view of an embodiment of the disclosure.
Figure 7:
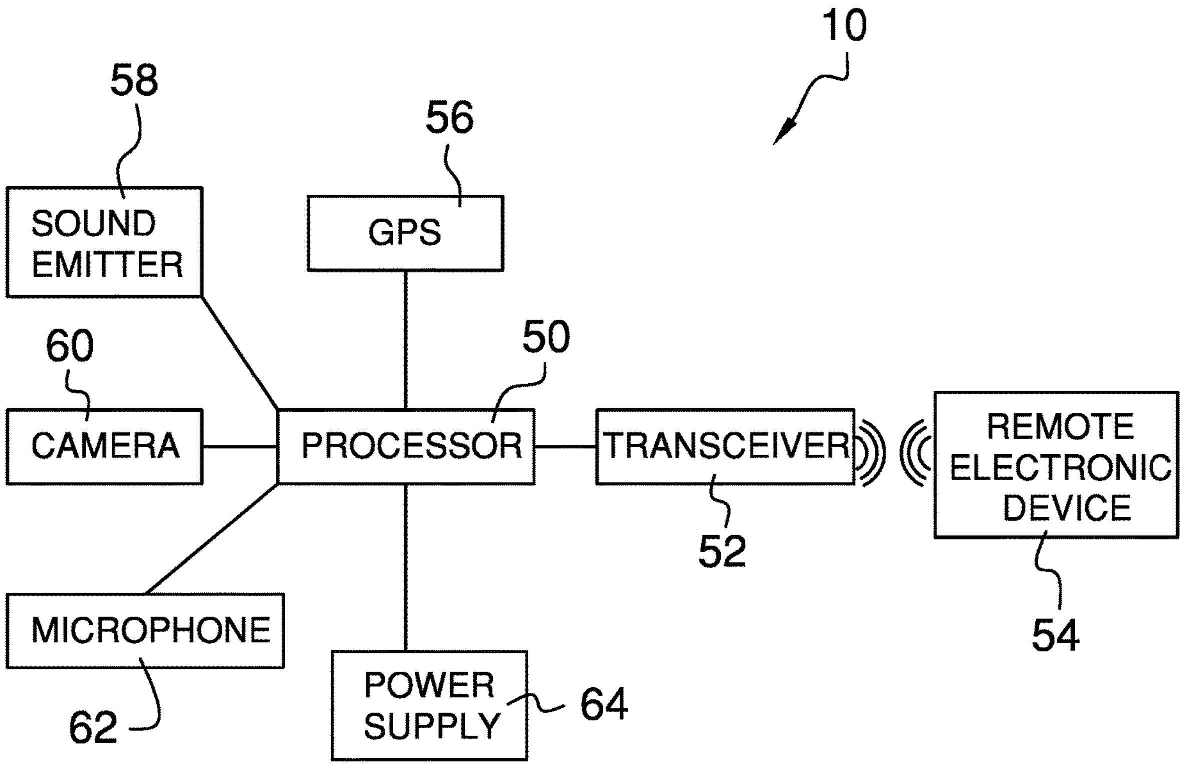
FIG. 7 is a block diagram of an embodiment of the disclosure.

With reference now to the drawings, and in particular to FIGS. 1 through 7 thereof, a new monitoring system embodying the principles and concepts of an embodiment of the disclosure and generally designated by the reference numeral 10 will be described.

As best illustrated in FIGS. 1 through 7, the monitoring system 10 generally comprises a housing 12 with a front side 14, a rear side 16, a top side 18, a bottom side 20, and a pair of lateral sides 22. A harness 24 coupled to the housing 12 and comprises a pair of shoulder mounts 26, a pair of straps 42, a buckle 44, and a pair of sliders 48. The pair of shoulder mounts 26 is coupled to the housing 12, and each shoulder mount 26 of the pair of shoulder mounts 26 extend upwardly and rearwardly from the housing 12. Each shoulder mount 26 of the pair of shoulder mounts 26 is elongated between a proximal end 28 and a distal end 30 with respect to the housing 12. The pair of shoulder mounts 26 diverge from each other upwardly from the proximal ends 28 thereof. Each shoulder mount 26 of the pair of shoulder mounts 26 is curved such that the shoulder mount 26 is configured for hooking onto an associated shoulder 38 of a pair of shoulders 38 of an individual 36 such that the housing 12 is positioned over a front side 14 of a torso 40 of the individual 36.

A thickness of each shoulder mount 26 between an inner surface 32 and an outer surface 34 thereof is less than a width of the shoulder mount 26 taken perpendicularly to the thickness. Each shoulder mount 26 of the pair of shoulder mounts 26 comprises a bendable material such that the shoulder mount 26 is bendable along a longitudinal axis of the shoulder mount 26 in a direction parallel to each lateral side 22 of the pair of lateral sides 22 of the housing 12. Each shoulder mount 26 of the pair of shoulder mounts 26 is also shaped such that the shoulder mount 26 is rigid preventing bending along the longitudinal axis in a direction perpendicular to each lateral side 22 of the pair of lateral sides 22 of the housing 12. In effect, the pair of shoulder mounts 26 conforms to the torso 40 and shoulders 38 of the individual 36 while resisting movement toward each other which would result in a strangulation hazard.

Each strap 42 of the pair of straps 42 is coupled to and extends between the distal end 30 of an associated one of the pair of shoulder mounts 26 and the housing 12. The buckle 44 is coupled to each strap 42 of the pair of straps 42 between the housing 12 and the associated shoulder mount 26 releasably couples the pair of straps 42 together to define a closed loop 46 comprising a portion of each strap 42 of the pair of straps 42, the housing 12, and the buckle 44. The closed loop 46 has a size such that the closed loop 46 is configured to surround the torso 40 of the individual 36. Each slider 48 of the pair of sliders 48 is coupled to an end of an associated one of the pair of straps 42 and slidably engages the strap 42 such that a length of the strap 42 between the housing 12 and the shoulder mount 26 is adjustable.

A processor 50 is mounted in the housing 12. A transceiver 52 is mounted in the housing 12 and is in communication with the processor 50. A remote electronic device 54 is in communication with the processor 50 via the transceiver 52 and is programmed to control the processor 50. A global positioning system (GPS) module 56 is mounted in the housing 12 and is in communication with the processor 50, which is programed to selectively cause the GPS module 56 to send a location signal to the processor 50 indicative of a location of the individual 36, the processor 50 is programmed to selectively transmit the location signal to the remote electronic device 54. A sound emitter 58 is mounted on the housing 12 and is in communication with the processor 50. The sound emitter 58 is directed forwardly from the housing 12, and the processor 50 is programmed to selectively cause the sound emitter 58 to emit an audible alarm.

A camera 60 is mounted on the housing 12 and is in communication with the processor 50. The camera 60 is directed forwardly from the housing 12, and the processor 50 is programmed to selectively cause the camera 60 to capture images. The images may be still images or moving images. The processor 50 is programmed to selectively store the images on a memory of the processor 50 and to selectively transmit the images via the transceiver 52 to the remote electronic device 54. A microphone 62 is mounted on the housing 12 and is in communication with the processor 50. The microphone 62 is positioned on the front side 14 of the housing 12, and the processor 50 is programmed to selectively cause the microphone 62 to record an audio. The processor 50 is programmed to selectively store the audio on the memory of the processor 50 and to selectively transmit the audio to the remote electronic device 54.

A power supply 64 is mounted in the housing 12 and is electrically coupled to the processor 50. The power supply 64 comprises a battery 66. A charging port 68 is mounted to an exterior of the housing 12 and is electrically coupled to the battery 66. The housing 12 may also be sealed to prevent water from reaching inside.

In use, the housing 12 is attached to the individual 36's torso 40 via the harness 24. The individual 36 may, for example, be a child or any person who requires supervision. A caregiver 70 operates the processor 50 via the remote electronic device 54. The caregiver 70 may determine the individual 36's location and activate the audible alarm. The caregiver 70 may also activate the camera 60 and the microphone 62 and review the images captures by the camera 60 and the audio captured by the microphone 62 via the remote electronic device 54.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A monitoring system for a caregiver to monitor an individual, the system comprising:

a housing having a front side, a rear side, a top side, a bottom side, and a pair of lateral sides;

a harness coupled to the housing, the harness being configured to attach to a torso of the individual such that the housing is positioned over the torso;

a processor being mounted in the housing;

a transceiver being mounted in the housing and being in communication with the processor;

a remote electronic device being in communication with the processor via the transceiver, the remote electronic device being programmed to control the processor; and a global positioning system (GPS) module being mounted in the housing and being in communication with the processor, the processor being programed to selectively cause the GPS module to send a location signal to the processor indicative of a location of the individual, the processor being programmed to selectively transmit the location signal to the remote electronic device.

2. The system of claim 1, further comprising a sound emitter being mounted on the housing and being in communication with the processor, the sound emitter being directed forwardly from the housing, the processor being programmed to selectively cause the sound emitter to emit an audible alarm.

3. The system of claim 1, further comprising a camera being mounted on the housing and being in communication with the processor, the camera being directed forwardly from the housing, the processor being programmed to selectively cause the camera to capture images.

4. The system of claim 3, wherein the processor is programmed to selectively store the images on a memory of the processor.

5. The system of claim 3, wherein the processor is programmed to selectively transmit the images via the transceiver to the remote electronic device.

6. The system of claim 1, further comprising a microphone being mounted on the housing and being in communication with the processor, the microphone being positioned on the front side of the housing, the processor being programmed to selectively cause the microphone to record an audio.

7. The system of claim 6, wherein the processor is programmed to selectively store the audio on the memory of the processor.

8. The system of claim 6, wherein the processor is programmed to selectively transmit the audio to the remote electronic device.

9. The system of claim 1, further comprising a power supply being mounted in the housing and being electrically coupled to the processor.

10. The system of claim 9, wherein the power supply comprises a battery.

11. The system of claim 10, further comprising a charging port being mounted to an exterior of the housing and being electrically coupled to the battery.

12. The system of claim 1, wherein the harness comprises:

a pair of shoulder mounts being coupled to the housing, each shoulder mount of the pair of shoulder mounts extending upwardly and rearwardly from the housing, each shoulder mount of the pair of shoulder mounts being elongated between a proximal end and a distal end with respect to the housing; and a pair of straps, each strap of the pair of straps being coupled to and extending between the distal end of an associated one of the pair of shoulder mounts and the housing.

13. The system of claim 12, wherein the pair of shoulder mounts diverge from each other upwardly from the proximal ends thereof.

14. The system of claim 12, wherein each shoulder mount of the pair of shoulder mounts is curved such that the shoulder mount is configured for hooking onto an associated shoulder of a pair of shoulders of the individual such that the housing is positioned over a front side of the torso of the individual.

15. The system of claim 12, wherein a thickness of each shoulder mount between an inner surface and an outer surface thereof being less than a width of the shoulder mount taken perpendicularly to the thickness, each shoulder mount of the pair of shoulder mounts comprising a bendable material such that the shoulder mount is bendable along a longitudinal axis of the shoulder mount in a direction parallel to each lateral side of the pair of lateral sides of the housing, each shoulder mount of the pair of shoulder mounts being shaped such that the shoulder mount is rigid preventing bending along the longitudinal axis in a direction perpendicular to each lateral side of the pair of lateral sides of the housing.

16. The system of claim 12, wherein the harness further comprises a buckle being coupled to each strap of the pair of straps between the housing and the associated shoulder mount, the buckle releasably coupling the pair of straps together to define a closed loop comprising a portion of each strap of the pair of straps, the housing, and the buckle, the closed loop having a size such that the closed loop is configured to surround the torso of the individual.

17. The system of claim 12, wherein the harness further comprises a pair of sliders, each slider of the pair of sliders being coupled to an end of an associated one of the pair of straps and slidably engaging the strap such that a length of the strap between the housing and the shoulder mount is adjustable.

18. A monitoring system for a caregiver to monitor an individual, the system comprising:

a housing having a front side, a rear side, a top side, a bottom side, and a pair of lateral sides;

a harness coupled to the housing, the harness comprising:

a pair of shoulder mounts being coupled to the housing, each shoulder mount of the pair of shoulder mounts extending upwardly and rearwardly from the housing, each shoulder mount of the pair of shoulder mounts being elongated between a proximal end and a distal end with respect to the housing, the pair of shoulder mounts diverging from each other upwardly from the proximal ends thereof, each shoulder mount of the pair of shoulder mounts being curved such that the shoulder mount is configured for hooking onto an associated shoulder of a pair of shoulders of the individual such that the housing is positioned over a front side of a torso of the individual, a thickness of each shoulder mount between an inner surface and an outer surface thereof being less than a width of the shoulder mount taken perpendicularly to the thickness, each shoulder mount of the pair of shoulder mounts comprising a bendable material such that the shoulder mount is bendable along a longitudinal axis of the shoulder mount in a direction parallel to each lateral side of the pair of lateral sides of the housing, each shoulder mount of the pair of shoulder mounts being shaped such that the shoulder mount is rigid preventing bending along the longitudinal axis in a direction perpendicular to each lateral side of the pair of lateral sides of the housing;

a pair of straps, each strap of the pair of straps being coupled to and extending between the distal end of an associated one of the pair of shoulder mounts and the housing;

a buckle being coupled to each strap of the pair of straps between the housing and the associated shoulder mount, the buckle releasably coupling the pair of straps together to define a closed loop comprising a portion of each strap of the pair of straps, the housing, and the buckle, the closed loop having a size such that the closed loop is configured to surround the torso of the individual; and a pair of sliders, each slider of the pair of sliders being coupled to an end of an associated one of the pair of straps and slidably engaging the strap such that a length of the strap between the housing and the shoulder mount is adjustable;

a processor being mounted in the housing;

a transceiver being mounted in the housing and being in communication with the processor;

a remote electronic device being in communication with the processor via the transceiver, the remote electronic device being programmed to control the processor;

a global positioning system (GPS) module being mounted in the housing and being in communication with the processor, the processor being programed to selectively cause the GPS module to send a location signal to the processor indicative of a location of the individual, the processor being programmed to selectively transmit the location signal to the remote electronic device;

a sound emitter being mounted on the housing and being in communication with the processor, the sound emitter being directed forwardly from the housing, the processor being programmed to selectively cause the sound emitter to emit an audible alarm;

a camera being mounted on the housing and being in communication with the processor, the camera being directed forwardly from the housing, the processor being programmed to selectively cause the camera to capture images, the processor being programmed to selectively store the images on a memory of the processor, the processor being programmed to selectively transmit the images via the transceiver to the remote electronic device;

a microphone being mounted on the housing and being in communication with the processor, the microphone being positioned on the front side of the housing, the processor being programmed to selectively cause the microphone to record an audio, the processor being programmed to selectively store the audio on the memory of the processor, the processor being programmed to selectively transmit the audio to the remote electronic device;

a power supply being mounted in the housing and being electrically coupled to the processor, the power supply comprising a battery; and a charging port being mounted to an exterior of the housing and being electrically coupled to the battery.

* * * * *